US006327054B1

United States Patent
Lassen

(10) Patent No.: US 6,327,054 B1
(45) Date of Patent: Dec. 4, 2001

(54) CLAMPING DEVICE FOR CONNECTING INTERCHANGEABLE SCANNING DRUMS TO THE ROTARY DRIVE OF DRUM SCANNERS

(75) Inventor: Bernd Lassen, Mönkeberg (DE)

(73) Assignee: Heidelberger Druckmaschinen Aktiengesellschaft, Kiel (DE)

( * ) Notice: Subject to any disclaimer, the term of this patent is extended or adjusted under 35 U.S.C. 154(b) by 0 days.

(21) Appl. No.: 09/030,000

(22) PCT Filed: Sep. 9, 1996

(86) PCT No.: PCT/DE96/01682

§ 371 Date: May 28, 1998

§ 102(e) Date: May 28, 1998

(87) PCT Pub. No.: WO97/10669

PCT Pub. Date: Mar. 20, 1997

(30) Foreign Application Priority Data

Sep. 12, 1995 (DE) .............................. 195 33 750

(51) Int. Cl.$^7$ ................................................. H04N 1/411
(52) U.S. Cl. ................................. 358/474; 358/296
(58) Field of Search ..................... 358/474, 296

(56) References Cited

U.S. PATENT DOCUMENTS

| 3,849,592 | * | 11/1974 | Rosenheck | 178/6 |
|---|---|---|---|---|
| 4,506,301 | * | 3/1985 | Kingsley | 358/280 |
| 4,543,615 | * | 9/1985 | Campenhout | 358/285 |
| 4,605,970 | * | 8/1986 | Hawkins | 358/265 |
| 4,902,156 | | 2/1990 | Deisler et al. | 403/24 |

FOREIGN PATENT DOCUMENTS

| 44 27 851 | 9/1995 | (DE) . |
|---|---|---|
| 0 279 874 | 2/1987 | (EP) . |
| 0 590 907 | 6/1994 | (EP) . |
| 2 248 901 | 10/1973 | (FR) . |

* cited by examiner

*Primary Examiner*—Jerome Grant, II
*Assistant Examiner*—Negussie Worku
(74) *Attorney, Agent, or Firm*—Schiff Hardin & Waite

(57) ABSTRACT

Interchangeable scanning drums of drum scanners that are seated at one side for scanning opaque or transparency image originals must be capable of being reliably and quickly connected to the rotatory drive of the scanner unit. Interchangeable drum structures facilitate the attachment of the image originals and allow an economic assembly of scanning drums that, preparatory to the job, can be loaded with image originals simultaneously with the scanning process. According to the Prior Art 874, it was hitherto necessary to design cost-intensive, actively supported work fixtures in order to achieve an adequately stable connection and a dependable, dynamic operation. The present invention avoids this disadvantage with a cost-beneficial design that makes use of centrifugal forces produced by the scanner rotation for the coupling of drum and drive motor flange in combination with toggle lever mechanisms.

9 Claims, 4 Drawing Sheets

OPEN CONDITION        CLAMPED CONDITION

CLAMPED CONDITION    OPEN CONDITION

CLAMPING DEVICE FOR CONNECTING INTERCHANGEABLE SCANNING DRUMS TO THE ROTARY DRIVE OF DRUM SCANNERS

BACKGROUND OF THE INVENTION

Interchangeable scanning drums of drum scanners that are seated at one side for scanning opaque or transparency image originals must be capable of being reliably and quickly connected to the rotatory drive of the scanner unit. Interchangeable drum embodiments facilitate the attachment of the image originals and allow an economic assembly of scanning drums that, preparatory to the job, can be loaded with image originals simultaneously with the scanning process. According to the Prior Art disclosed in, among others, European Letters Patent EP 0 279 874, it was previously necessary to design cost-intensive, actively supported coupling device in order to achieve an adequately stable connection and a dependable, dynamic operation.

SUMMARY OF THE INVENTION

It is an object of the present invention to avoid the above disadvantage with a cost-beneficial design. The present invention makes use of centrifugal forces produced by the scanner rotation for the coupling of the drum and the drive motor flange with toggle lever mechanisms.

According to the clamping device system of the invention for an interchangeable scanning drum seated at one side in a drum scanner for scanning of opaque and transparency image originals for achieving an adequately stable connection and reliable, dynamic operation, a scanning drum is provided having a mounting flange centrally positioned relative to an acceptance flange of a drive motor. The mounting flange of the scanning drum is connected to the acceptance flange of the drive motor with a plurality of clamping devices. Each clamping device is formed of a tension lever, a connecting rod, and a clamp lever. Each clamping device has at least one spring for generating a basic gripping force for initial fixing and for preventing sliding upon run-up, the basic gripping force being transmitted via the tension lever, the connecting rod, and the clamped lever. Upon rotation of the scanner, centrifugal force acts upon a toggle lever mechanism in each clamping device formed of the tension lever, the connecting rod, and the clamp lever, so that the gripping force of the clamp lever against the collar of the drum flange is greatly increased in a simple way in order to generate a stable and reliable coupling of the mounting and acceptance flanges, despite a tilting force produced by a residual imbalance. Only a slight release switch force is provided for a drum change due to the low basic gripping force.

The invention is explained in greater detail below with reference to FIGS. 1, 2, 3 and 4.

DESCRIPTION OF THE PREFERRED EMBODIMENTS

Figure 1:
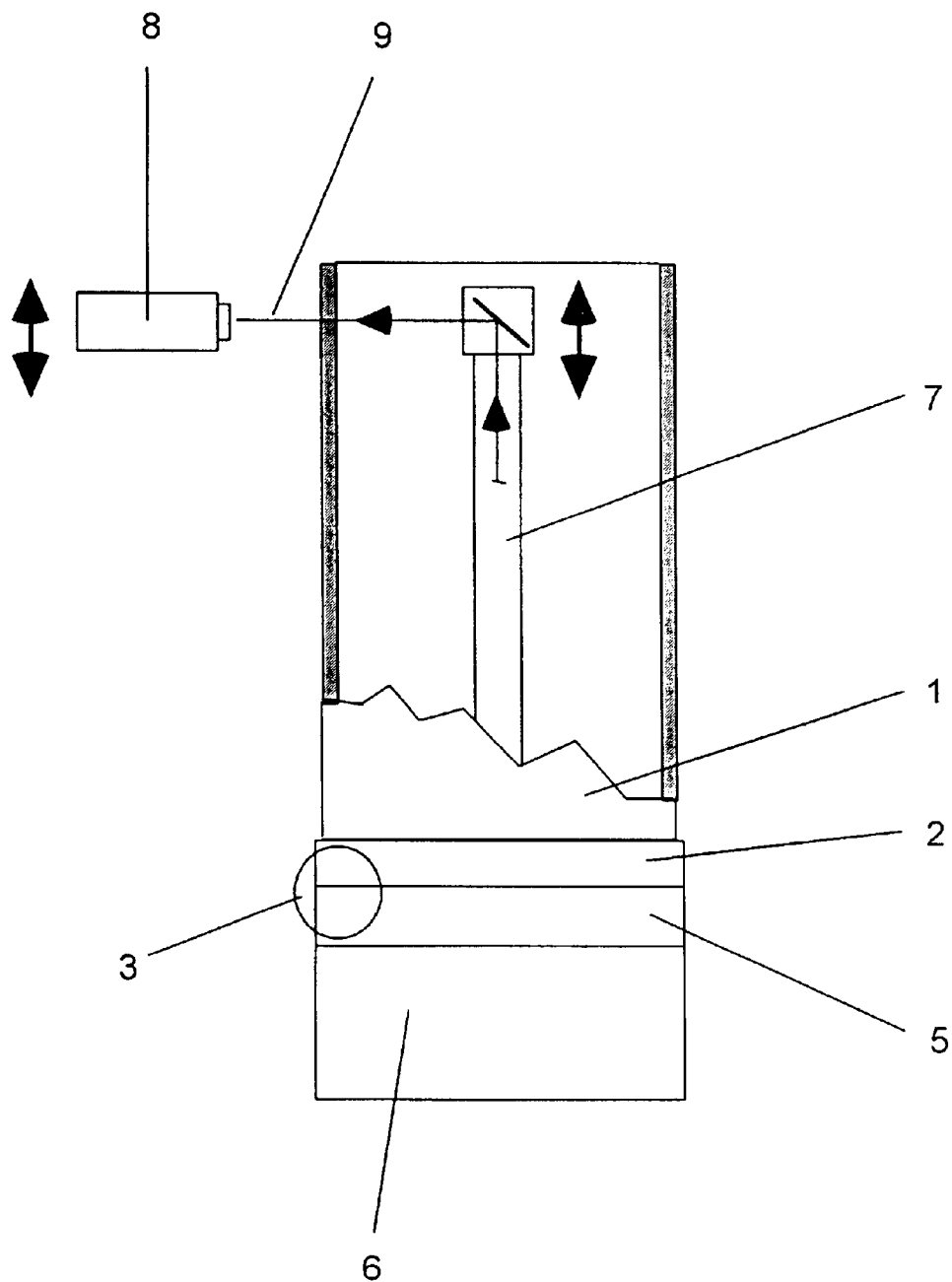
FIG. 1 shows the schematic diagram of a drum scanner.

FIG. 1 demonstrates the principle of a drum scanner with a vertical drum axis. A scanning drum 1 seated at one side is formed of glass in order to be able to scan transparent image material with transmitted light in addition to opaque image material. The scanning drum is held in a metal flange 2 and rests together with this metal flange on the motor flange (5), which forms a unit with the drive motor 6. Metal flange (2) and motor flange (5) are coupled by three clamping devices arranged offset by 120° at the circumference that are accommodated in the motor flange and detailed in FIG. 2. One of the clamping devices is indicated with a circle 3. During a scanning event, the drum (1) rotates and illumination arm (7) and scanner unit 8—rigidly coupled to one another—move parallel to the drum axis in the drive motor 6 direction. An image original mounted on the drum surface is thereby resolved into scan lines by the light beam 9. At the end of the scanning, the illumination arm 7 has entered into a hollow shaft of the motor flange 5 and the drive motor 6.

Figure 2:
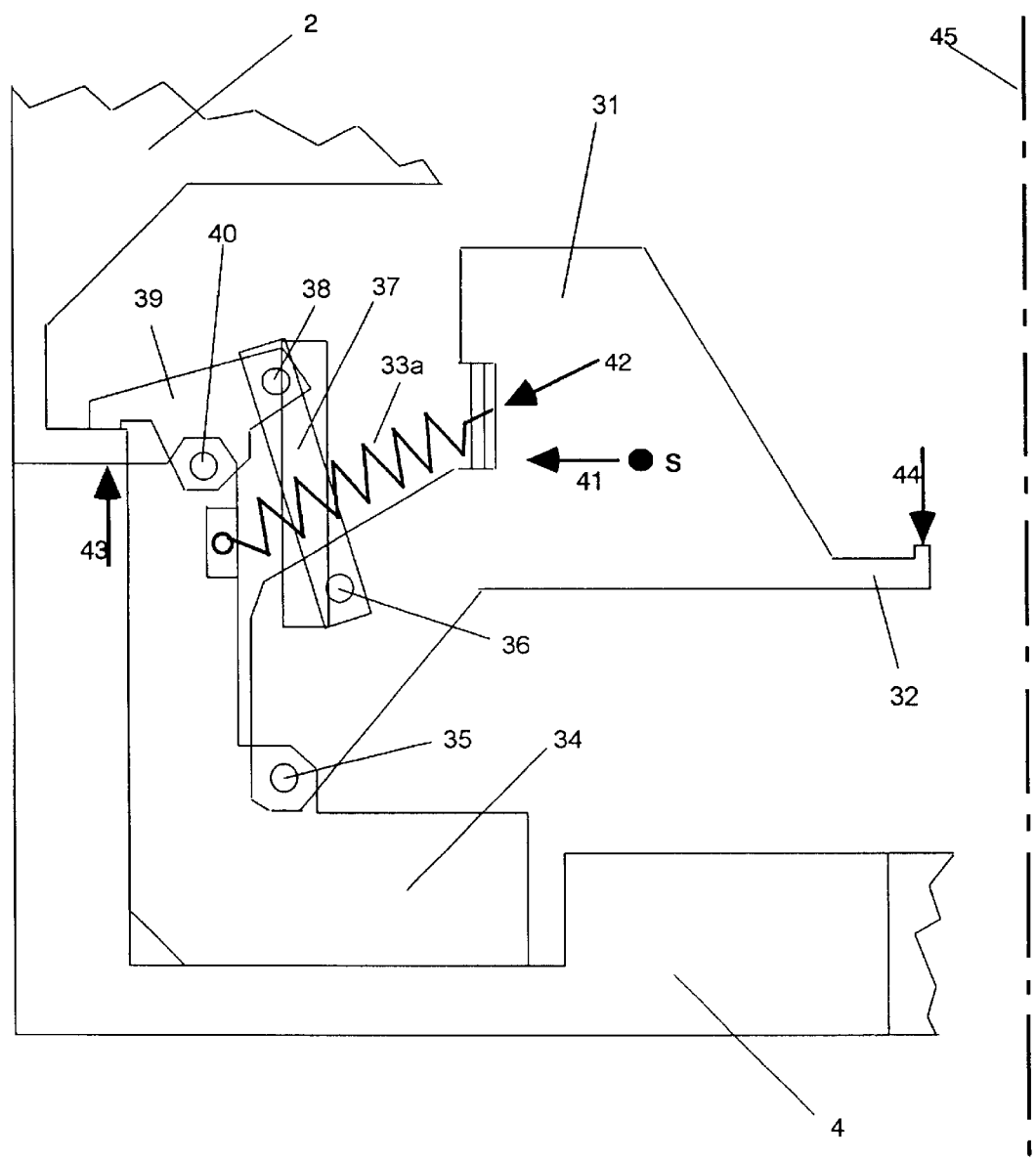
FIG. 2 shows a schematic diagram of a clamping device.

FIG. 2 outlines how a centrifugal force 41 in interaction with an extremely slight, static spring power 42 is used for generating a desired gripping force 43. The motor flange 4 carries the structural elements of the clamping device. Its base is formed by a foot 34. A tension lever 31 is connected thereto via a shaft 35. A connecting rod 37 with axial connections 36 and 38 enables the force transmission from the tension lever 31 onto a clamp lever 39. The clamp lever 39, like the tension lever 31, is connected to the foot 34 via an axial connection 40. A tension spring 33a already ensures a basic gripping force 43 for fixing the metal flange of the scanning drum 2 on the motor flange 4 when the drum stands still. It is structurally insured that the drum tension can only be released by a release force 44 via a release finger 32 when the drum stands still. Given rotation of the scanning drum 1 with its flange 2 as well as of the drive motor 6 with its flange 5 around the axis 5, the centrifugal force 41 is added to the static spring force 42 and intensifies the gripping force 43.

Figure 3A:
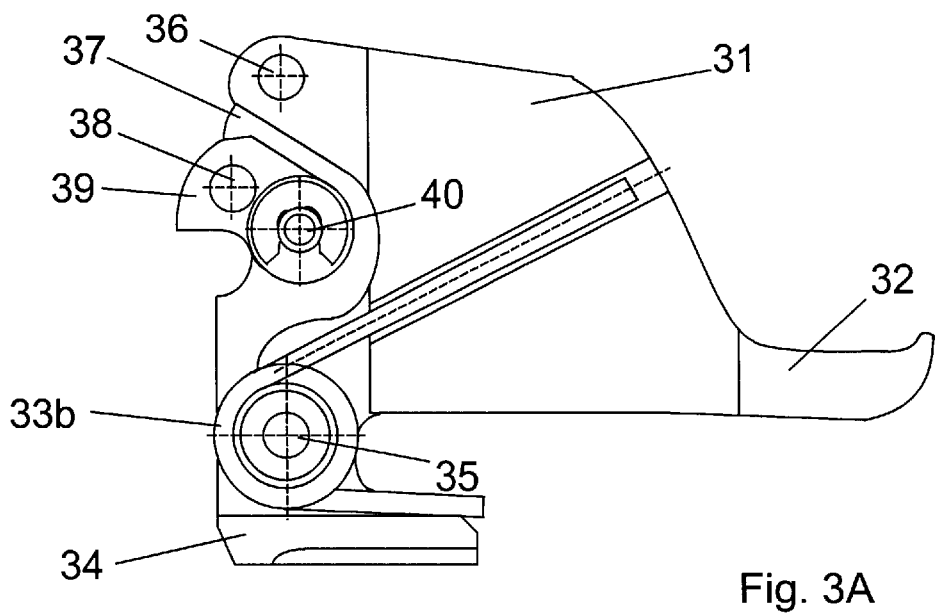
FIGS. 3A and 3B illustrate a structural embodiment of a clamping device in a side view and in a perspective view, respectfully.
Figure 3B:
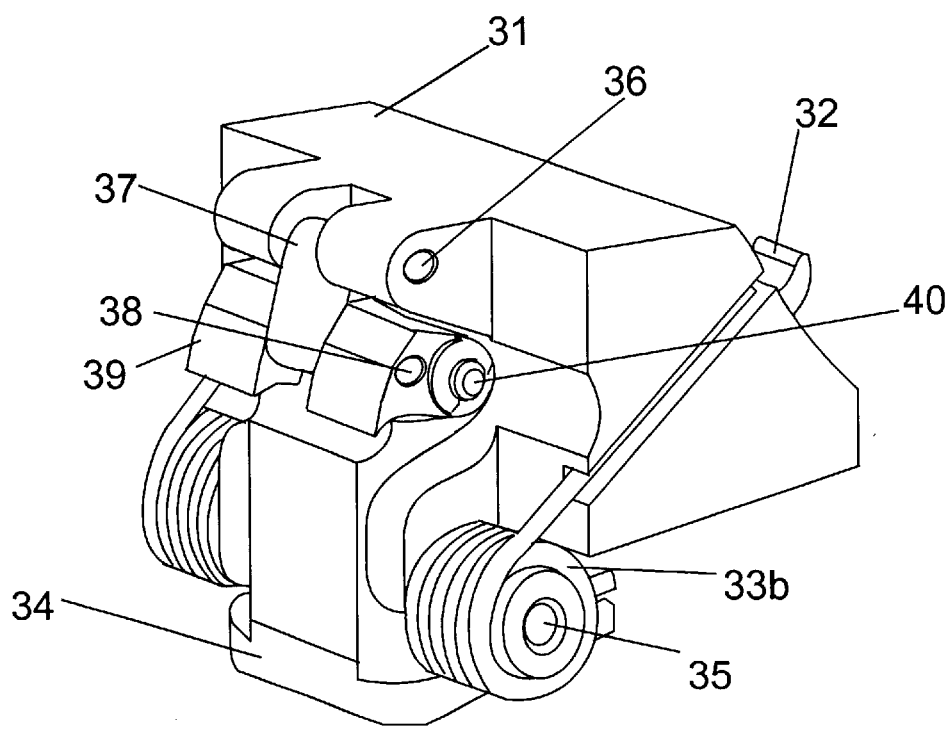
Figure 4:
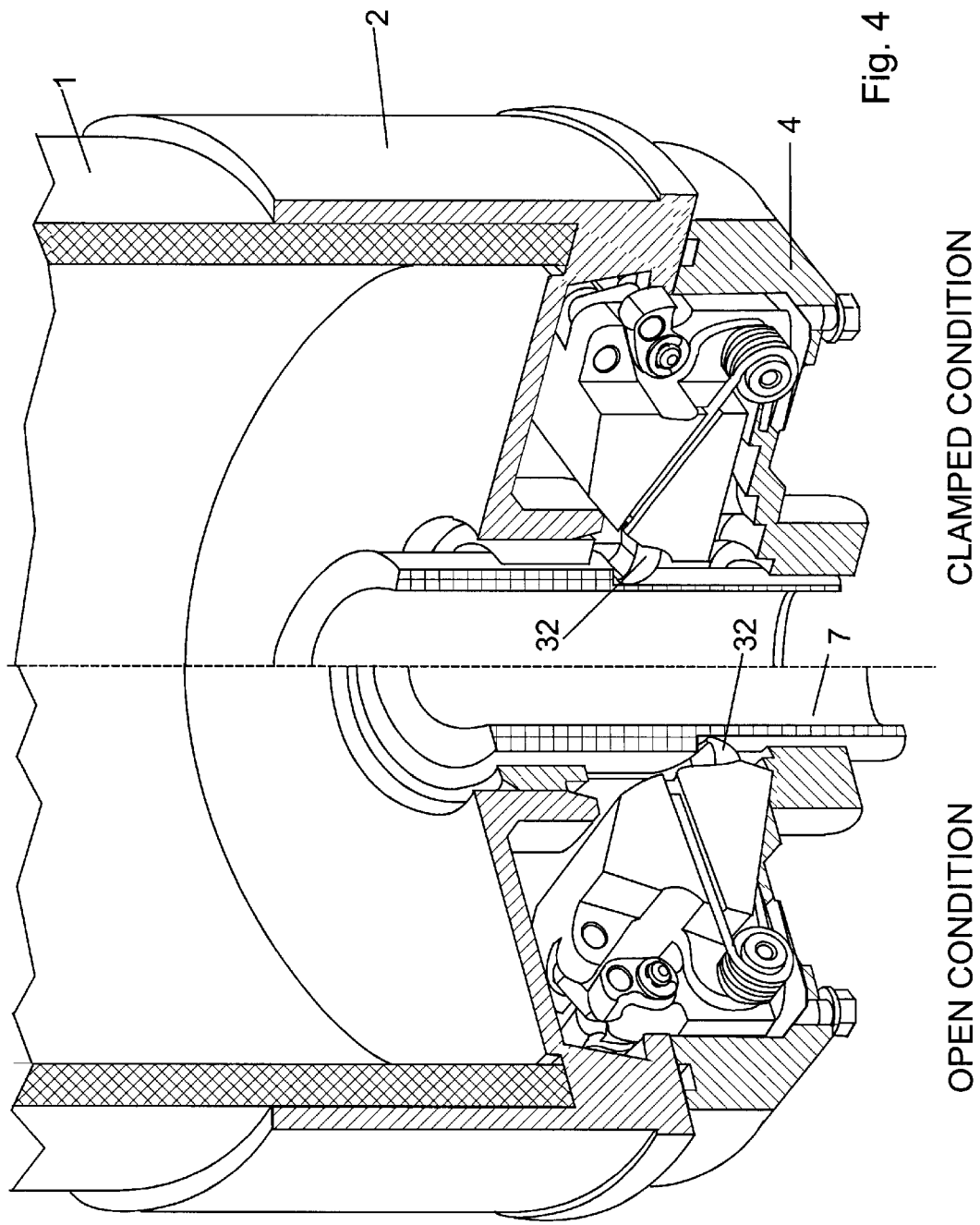
FIG. 4 illustrates a perspective sectional view of the installation environment of the clamping device according to FIG. 3.

FIGS. 3A and 3B show a structural embodiment of the clamping device 3 in a side view and perspective view, respectfully. In this embodiment, more beneficial positions of the axial connections and a torsion spring 33b instead of the tension spring 33a were selected. The other structural elements known from FIG. 2, such as foot 34 tension lever 31 connecting rod 37 clamp lever 39 and the axial connections 35, 36, 38 and 40 serve the purposes described above with respect to FIG. 2. In a perspective sectional view, FIG. 4 demonstrates the installed position of the clamp device shown in FIG. 3. The left half of the Figure thereby shows the released, untensed condition and the right half of the Figure shows the tension or clamping condition. The glass scanning drum 1 with flange 2 motor flange 4 two of the total of three work fixtures 3 arranged offset by 120° in the circumferential direction, and the head part of the illumination arm 7 via which the release finger 32 is actuated can be seen. In another structural embodiment, a release circuit could act proceeding from the outer circumferential surface of the motor flange 4 instead of from the inside through a hollow shaft. Slight spring forced suffice for an initial fixing of the scanning drum and for preventing it from sliding upon run-up, which means that only a slight switch force for changing drums is advantageously required when the drum stands still. In addition to an extremely small, unavoidable residual imbalance, original scan images that can never be mounted on the drum surface completely uniformly distributed also effect high tilting forces given the standard, high scanner speeds of approximately 2000 min~1. Gripping forces that are up to these imbalance conditions can be generated in a simple way with low expense by the described utilization of the centrifugal force. The operational dependability would be maintained given potential spring failures. The invention can be realized both for vertical as well as for horizontal rotational attitudes of the scanning drum. A retainer hook according to the initially cited Letters Patent can be utilized for the horizontal rotational attitude for the absorption of the tilting moment in the drum coupling.

Although various minor changes and modifications might be proposed by those skilled in the art, it will be understood that my wish is to include within the claims of the patent warranted hereon all such changes and modifications as reasonably come within my contribution to the art.

I claim:

1. A clamping device system for an interchangeable scanning drum seated at one side in a drum scanner for scanning of opaque or transparency image originals for achieving an adequate stable connection and reliable, dynamic operation, comprising:

a scanning drum having a mounting flange centrally positioned relative to an acceptance flange of a drive motor, the mounting flange of the scanning drum being connected to the acceptance flange of the drive motor with a plurality of clamping devices, each clamping device being formed of a tension lever, a connecting rod, and a clamp lever;

each clamping device having at least one spring for generating a basic gripping force for initial fixing and for preventing sliding upon run-up rotation of the scanning drum, the basic gripping force being transmitted via said tension lever, said connecting rod, and said clamp lever;

each said clamping device being designed such that upon rotation of the scanner, centrifugal force is acted on a toggle lever mechanism formed of said tension lever, said connecting rod, and said clamp lever such that the gripping force of the clamp lever against the mounting flange of the scanning drum is greatly increased in a simple way in order to generate a stable and reliable coupling between the mounting flange of the scanning drum and the acceptance flange of the drive motor despite tilting forces produced by residual imbalances; and said at least one spring in each coupling device being designed such that only a relatively slight release switch force is necessary for a drum change due to said basic gripping force being relatively low in absence of centrifugal forces generated upon rotation of the scanning drum.

2. The clamping device system according to claim 1 wherein a rotational axis of the scanning drum runs vertically.

3. The clamping device system according to claim 1 wherein a rotational axis of the scanning drum runs horizontally.

4. The clamping device system according to claim 1 wherein three of said clamping devices are circumferentially spaced around an inside of the scanning drum at equal circumferential spacings.

5. The clamping device system according to claim 1 wherein each clamping device has a member for actuating the tension lever for relieving the basic gripping force from inside of the scanning drum.

6. The clamping device system according to claim 5 wherein the tension lever is activated for releasing the basic gripping force from an inside of the scanning drum through a hollow shaft.

7. The clamping device system according to claim 5 wherein the tension lever is activated to release the basic gripping force through an outside wall of the motor flange.

8. The clamping device system according to claim 1 wherein a release finger is provided as an extension of said tension lever for application of said release force to said tension lever to release said basic gripping force of said clamp lever.

9. A scanning drum system, comprising:

an interchangeable scanning drum seated at one side in a drum scanner for scanning of image originals, the scanning drum having a mounting flange abutting an acceptance flange of a drive motor and held in abutting position by at least one clamping device, the clamping device being formed of a tension lever connected to a clamp lever;

the clamping device having at least one spring for generating a basic gripping force for initial fixing and for preventing sliding during initial run-up rotation of the scanning drum, the basic gripping force being transmitted via said clamp lever;

said clamping device being designed such that upon rotation of the scanner, centrifugal force acts on said tension lever such that the gripping force of the clamp lever against the mounting flange of the scanning drum is greatly increased in order to generate a stable and reliable coupling between the mounting flange of the scanning drum and the acceptance flange of the drive motor; and said tension lever having a portion for receiving a release force for overcoming said basic gripping force so as to release said clamp lever from said scanning drum mounting flange for a drum change.

\* \* \* \* \*